April 14, 1964  G. O. HUNTZINGER  3,129,375
POWER SUPPLY UTILIZING A MAGNETIC AMPLIFIER FOR D.C. CONTROL
Filed May 24, 1960  2 Sheets-Sheet 1

INVENTOR.
Gerald O. Huntzinger
BY
C.R. Meland
His Attorney

# United States Patent Office 3,129,375
Patented Apr. 14, 1964

---

3,129,375
POWER SUPPLY UTILIZING A MAGNETIC
AMPLIFIER FOR D.C. CONTROL
Gerald O. Huntzinger, Anderson, Ind., assignor to General Motors Corporation, Detroit, Mich., a corporation of Delaware
Filed May 24, 1960, Ser. No. 31,366
6 Claims. (Cl. 321—16)

This invention relates to power supplies for transforming alternating current to regulated direct current.

One of the objects of this invention is to provide a power supply system for converting alternating current to regulated direct current wherein the system includes a magnetic amplifier for controlling the D.C. output voltage and further wherein the amplifier is controlled by a circuit network that includes a voltage responsive diode such as a Zener diode.

Another object of this invention is to provide a power supply system for converting A.C. to D.C. that includes a six phase half-wave rectifier arrangement connected with the load windings of a magnetic amplifier that controls the D.C. output voltage. In this circuit, the load current is never required to flow through two rectifiers in series, thus reducing heating of the rectifiers and reducing the voltage drop across the rectifiers.

Still another object of this invention is to provide a power supply system for converting A.C. to D.C. wherein a magnetic amplifier controls the D.C. output voltage and wherein means are provided for controlling the magnetic amplifier to cause the D.C. output voltage to increase with increasing load to a point and then decrease with further increasing load.

A further object of this invention is to provide a power supply system for converting A.C. to D.C. which includes a magnetic amplifier for controlling the D.C. output voltage, the cores of the magnetic amplifier being formed of magnetic material having a rectangular hysteresis loop, and further wherein the cores are reset by a current that is a function of the D.C. output voltage.

A further object of this invention is to provide a power supply of the type described that compensates for line voltage drop. This object is realized by the rising voltage characteristic of the power supply.

Still another object of this invention is to provide a power supply for charging storage batteries that is capable of providing a continuous charge when load is high or batteries are discharged and a pulse charge when load is low or batteries are charged. This serves to reduce gassing and maintenance of the batteries.

Further objects and advantages of the present invention will be apparent from the following description, reference being had to the accompanying drawings, wherein a preferred form of the present invention is clearly shown.

Figure 1:
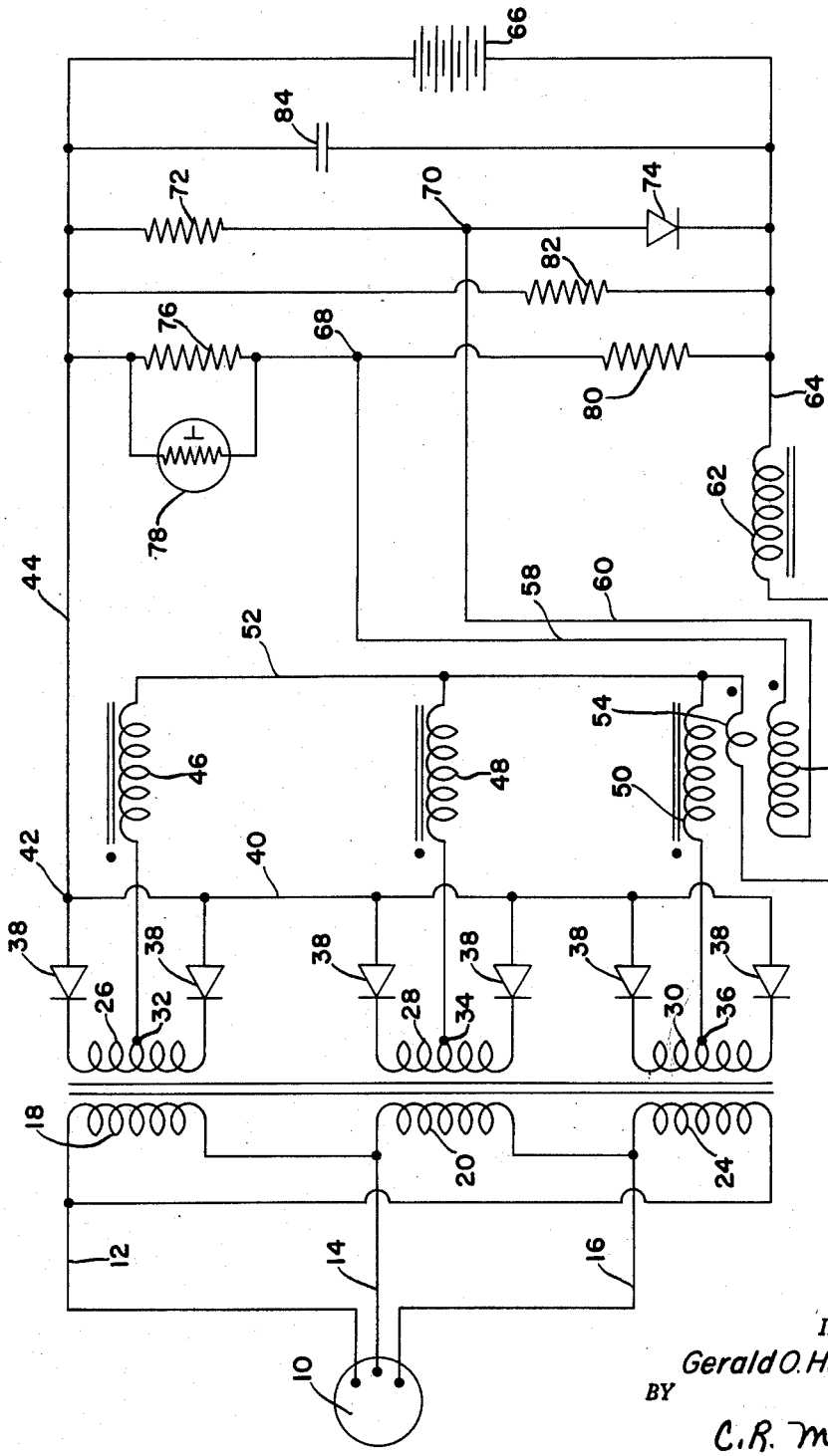
FIGURE 1 is a schematic circuit diagram of a power supply system made in accordance with this invention.

Referring now to the drawings and more particularly to FIGURE 1, the reference numeral 10 indicates a three-phase source of A.C. voltage which may be a generator or other type of three-phase power supply. The output terminals of the power source 10 are connected with lead wires 12, 14 and 16 which in turn are connected with the primary windings 18, 20 and 24 of a step-down transformer. This transformer has secondary windings 26, 28 and 30 which are center tapped at 32, 34 and 36. A plurality of rectifiers 38 are provided which are connected respectively between the secondary windings 26, 28 and 30 and a common lead wire designated by reference numeral 40. One of the rectifiers 38 is connected with junction 42 and it is seen that this junction is connected with a lead wire 44.

Magnetic amplifier means are provided which include load or reactor windings 46, 48 and 50 connected respectively with the center taps 32, 34, and 36 of secondary windings 26, 28 and 30. The opposite sides of load windings 46, 48 and 50 are connected with a common lead wire 52 which in turn is connected with a control winding 54. A second control winding 56 is provided. The load windings 46, 48 and 50 together with control windings 54 and 56 are wound on cores of magnetic material. The core material used for magnetically coupling the various windings of the magnetic amplifiers is formed of a magnetic material that ideally has a substantially rectangular hysteresis loop. As an example, the core material for the magnetic amplifier may be formed of a material known in the trade as Orthonol which has a principal chemical composition of 50% iron and 50% nickel.

The control winding 54 is connected between lead wire 52 and a filter choke 62. The opposite side of the filter choke is connected with a lead wire 64 and it is seen that the lead wires 44 and 64 form the D.C. output leads for the power supply. The lead wires 44 and 64 in this case supply charging current to a battery 66 connected directly across the lead wires.

The lead wires 58 and 60 which are connected with control winding 56 are connected with junctions 68 and 70. A resistor 72 is connected between junction 70 and the lead wire 44 and a voltage responsive diode 74 of the Zener type is connected between junction 70 and the lead wire 64. A resistor 76 is connected between junction 68 and lead wire 44 and this resistor is shunted by a thermistor 78. Another resistor 80 is connected between junction 68 and the lead wire 64. A resistor 82 is connected directly across the lead wires 44 and 64 as is the condenser 84.

In the operation of the circuit illustrated in FIGURE 1 pulsating direct current is supplied to the storage battery 66 during positive half-cycles of the applied voltage and this current will be supplied through the load windings 46, 48 and 50 of the magnetic amplifiers. It will be appreciated that the cores and the load windings 46, 48 and 50 will absorb a voltage integral during positive half-cycles of the applied voltage up to the point where they become fully saturated. After saturation of these cores, there will be no voltage absorbed and the magnetic amplifier may be thought of as firing to apply some portion of the applied voltage to the battery 66. The saturation of the cores is controlled by the control windings 54 and 56. Thus, by controlling the current flow to these control windings, it is possible to control the firing of the magnetic amplifier and thus control the voltage being applied to the battery 66 via lead wires 44 and 64. In this connection, it is to be noted that the control winding 54 is connected in series with the lead wire 64 and its current thus is substantially equal to load current. The current flow through control winding 56 will be a function of the potential difference between junctions 68 and 70.

The potential difference of junctions 68 and 70 is controlled by the network including resistors 72 and 80, resistor 76 and thermistor 78 and the Zener diode 74. The Zener diode maintains the junction 70 at some fixed potential with respect to the lead wire 64 because of the constant voltage characteristic of the diode. When the voltage across leads 44 and 64 changes, the potential of junction 68 is varied with respect to junction 70 thus varying the current flow through the control winding 56. As the voltage across lead wires 44 and 64 increases the potential difference between junctions 68 and 70 increases, thus increasing the current flow through the control winding 56. This increase in current flow through control winding 56 will increase the resetting of the cores thus causing the magnetic amplifier to fire later in its cycle to reduce the voltage being applied to lead wires 44 and 64. It can be seen that the control winding 56 thus serves to regulate the voltage appearing across lead wires 44 and 64.

It is pointed out that the effect of the currents flowing through control windings 54 and 56 are in opposition, the current through coil winding 56 tending to reset the magnetic cores and the current flow through coil winding 54 opposing this resetting action. In other words, the current flow through coil winding 56 drives the cores further away from their saturation points while the current flow through the coil winding 54 drives the cores toward their saturation points. The point at which the cores become saturated is thus a result of the composite effect of current flows through coil windings 54 and 56.

Since the effects of current in coil winding 54 are in opposition to the effects of current in coil winding 56, a greater current must flow in winding 56 before voltage regulating action can take place. This additional current flows through the resistance of winding 56 and the components of the bridge network, resistors 72, 76, 78 and 80 and the dynamic resistance of Zener diode 74. In order to obtain this increased current through the combination of these fixed resistances, the voltage across leads 44 and 64 must increase. Thus it is seen that the regulated voltage across lead wires 44 and 64 will rise as the load current increases.

When load increases to the point that the regulated voltage required across leads 44 and 64 is greater than that obtainable from the transformer-rectifier system, the output voltage becomes unregulated and decreases with further increase in load current.

The thermistor, 78, connected in parallel with resistor 76 provides temperature compensation so that the regulated output voltage is not affected by temperature changes. The capacitor, 84 in conjunction with inductor 62 provides a filter to reduce ripple in the output voltage and current. The resistor 82 provides a small amount of internal load so that the magnetic amplifiers can provide regulating action under no load conditions.

Figure 2:
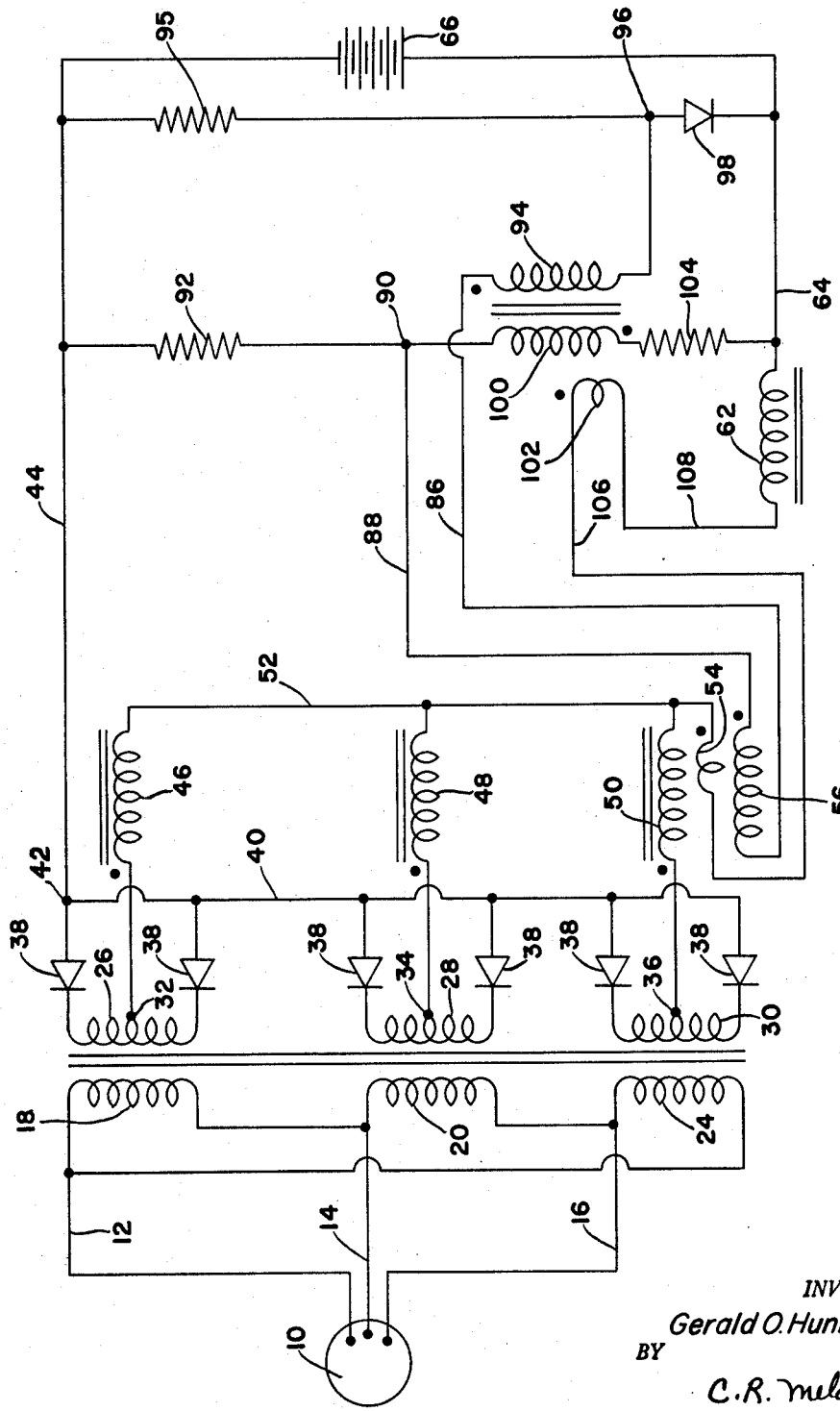
FIGURE 2 is a modified circuit arrangement of a power supply system made in accordance with this invention.

There is a basic limitation in the amount of voltage which can be absorbed by the load windings 46, 48, and 50 in the circuit of FIGURE 1. When the amount of voltage integral to be absorbed is such that two of the load windings must be absorbing simultaneously over a part of a cycle of input power, the third winding will be saturated at these times and there will be high circulating currents in control winding 56. This impairs the regulating action of the circuit. When it is necessary to obtain operation beyond this limiting condition, the circuit is modified as shown in FIGURE 2. In this circuit, a transformer with windings designated by reference numerals 94, 100 and 102 is used to minimize the circulating currents and thus extend the range of voltage absorption.

Referring now to FIGURE 2, the modified circuit arrangement is illustrated and the same reference numerals have been used in FIGURE 2 as were used in FIGURE 1 to designate identical circuit elements in each figure. In the circuit of FIGURE 2, the power source, power transformer, rectifiers and magnetic amplifiers have the same identifying numerals as those illustrated in FIGURE 1. In FIGURE 2 the control winding 56 is connected with lead wires 86 and 88. It is seen that lead wire 88 is connected with junction 90 and that a resistor 92 is connected between lead wire 44 and the junction 90. A coil winding 94 has one side thereof connected with lead wire 86 and has an opposite side connected to junction 96. A resistor 95 is connected between lead wire 44 and junction 96. The coil winding 94 is magnetically coupled with coil windings 100 and 102 by winding them on the same core. The coil winding 100 is connected between junction 90 and a resistor 104. The opposite side of resistor 104 is connected with lead wire 64 as is clearly apparent from FIGURE 2. The coil winding 102 is connected with lead wires 106 and 108 which serve to connect the coil winding 102 between the filter choke 62 and the control winding 54.

In the circuit of FIGURE 2, the transformer consisting of a core and coil windings 94, 100 and 102 serves to prevent circulating currents in the control circuit which includes lead wires 86 and 88, caused by voltages induced in the load windings 46, 48 and 50 during the time when two of the load windings are absorbing a voltage integral and one of the load windings is saturated. The core of this transformer preferably is made by winding a thin ribbon of magnet material into the shape of a continuous ring so as to minimize the exciting current required for transformer operation. The primary winding 94 is wound upon this core and connected in series with control winding 56 by means of lead wire 86. It is the purpose of winding 94 to absorb the induced voltages and thus prevent circulating currents in the control circuit. The D.C. control current flowing in winding 94 would easily saturate the transformer core wire if not for winding 100. This winding is connected in series with resistor 104 and is polarized so that the effect of the D.C. current in winding 100 is in opposition and slightly greater than the effect of the D.C. current in winding 94. This places the flux in the core at the point of negative saturation thus permitting a flux excursion in the positive direction whenever winding 94 is required to absorb an induced voltage from control winding 56.

By making winding 94 a large number of turns, say 300 and winding 100 a relatively small number, say 30, and, by adjusting resistors 92 and 104 so that the current flowing through winding 100 gives the proper magnetic bias in the core, it is possible to obtain a very high effective impedance across winding 94 for the suppression of circulating A.C. currents. At the same time, the D.C. resistance of winding 94 is kept low so that the rise in output voltage with increasing load current can be controlled as desired.

Since the D.C. control current in winding 94 increases with increasing load current, whereas the bias current flowing through winding 100 remains relatively constant, it is necessary to provide an additional bias which also increases with increasing load current to maintain the core at the point of negative saturation. This is accomplished by passing load current through an additional winding 102 on the core. This winding contains typically 1 or 2 turns so polarized as to bias the core towards negative saturation.

While the embodiments of the present invention as herein disclosed, constitute a preferred form it is to be understood that other forms might be adopted.

What is claimed is as follows:

1. A power supply system comprising a source of A.C. voltage, a direct current load circuit, rectifier and reactor means connected between said voltage source and said load circuit for converting said A.C. voltage to regulated direct current applied to said load circuit, said reactor means including first and second control winding means, a first circuit connected across said load circuit including a pair of resistors having a common junction, a second circuit connected across said load circuit including a resistor and a Zener diode having a common junction, means connecting said first control winding means across said junctions, and means connecting said second control winding means directly in series with said load circuit, said first and second control winding means controlling the saturation of said reactor means and opposing each other.

2. A power supply system comprising a source of A.C. voltage, a two-lead direct current circuit, rectifier and magnetic amplifier means including a load winding connected between said A.C. voltage source and said two lead circuit for converting the A.C. voltage of said source to regulated direct current applied to said two lead circuit, said magnetic amplifier means including first and second control windings, reactor means including first, second and third coil windings magnetically coupled, a first circuit connected across said two-lead circuit including a resistor, a first coil winding of said reactor means and a second resistor, said first coil winding and one of said resistors having a common junction, a second circuit connected across said two lead direct current circuit including a resistor and a Zener diode having a common junction, a control circuit connected between said junctions including said second control winding and said second coil winding of said reactor means, and means connecting said first control winding and said third coil winding of said reactor means in series with one of the leads of said two lead direct current circuit, said first and second coil windings of said reactor means being connected such that their magnetic flux is in opposition.

3. A power supply system comprising, a source of A.C. voltage, a two lead direct current circuit, rectifier and first reactor means connected between said A.C. voltage source and said two lead circuit, said first reactor means including load winding means and first and second control winding means, a first circuit network connected across said two lead circuit including a circuit element having resistance and a voltage responsive diode, said circuit element and diode having a common junction, second reactor means having first and second magnetically coupled windings, a second circuit connected across said lead wires including a resistor and a first winding of said second reactor means having a common junction, means connecting said first control winding means in series with a second winding of said second reactor means and across said junctions, and means connecting said second control winding means in series with said load winding means.

4. A power supply system comprising, a source of A.C. voltage, rectifier and first reactor means connected between said source of A.C. voltage and a two wire direct current circuit, said first reactor means including load winding means and first and second control winding means, a second reactor means having first, second and third windings all magnetically coupled together, a first circuit connected across said two wire circuit including a resistor and a Zener diode having a common junction, a second circuit connected across said two wire circuit including a resistor and said second winding having a common junction, a control circuit connected with said junctions including said second control winding means and said third winding, and means connecting said first control winding means and said first winding of said second reactor means in series with said load winding means.

5. A power supply system comprising, a source of three phase alternating current, a transformer having three primary windings energized from said source and three center tapped secondary windings, rectifiers connected respectively with opposite ends of each secondary windings and having a common connection with a lead wire that forms one terminal of a direct current supply circuit, magnetic reactor means including three load windings and first and second control windings, means connecting one side of said load windings together to form the other terminal of said direct current supply circuit, means connecting the opposite sides of said load windings with the center taps on said secondary windings, means connecting said first control winding in series with one of said terminals whereby load current passes therethrough, a first voltage dividing network connected across said direct current supply circuit including at least two resistors having a common junction, a second voltage dividing network connected across said direct current supply circuit including a Zener diode and a resistor having a common junction, and means connecting said second control winding across said junctions whereby said second control winding is fed with a current that varies in accordance with changes in output voltage appearing across said direct current supply circuit, said first and second control windings being connected such that their magnetic fluxes are in opposition.

6. A power supply system comprising, a source of A.C. voltage, rectifier and first reactor means connected between said source of A.C. voltage and a two wire direct current circuit, said first reactor means including load winding means and control winding means, a second reactor means having first and second windings that are magnetically coupled together, a control circuit connected across said two wire direct current circuit for developing a voltage at two control terminals which varies with the voltage appearing across said two wire direct current circuit, circuit means connecting said control winding means with said control terminals including said first winding of said second reactor means, a circuit across said two wire direct current circuit including the second coil winding of said second reactor means, the magnetic effects of said first and second windings of said second reactor means being in opposition.

References Cited in the file of this patent
UNITED STATES PATENTS

| | | |
|---|---|---|
| 1,650,072 | Jonas et al. | Nov. 22, 1927 |
| 1,965,439 | Stoller | July 3, 1934 |
| 2,182,666 | Hanley | Dec. 5, 1939 |
| 2,306,998 | Claesson | Dec. 29, 1942 |
| 2,373,383 | Christopher | Apr. 10, 1945 |
| 2,428,693 | Anderson | Oct. 7, 1947 |
| 2,488,711 | Cross | Nov. 22, 1949 |
| 2,503,880 | Mah | Apr. 11, 1950 |
| 2,555,544 | Holt et al. | June 5, 1951 |
| 2,569,500 | Sorensen | Oct. 2, 1951 |
| 2,751,545 | Chase | June 19, 1956 |
| 2,790,127 | Hamilton | Apr. 23, 1957 |
| 2,945,171 | Louden | July 12, 1960 |